United States Patent
Garner et al.

(10) Patent No.: US 6,819,807 B2
(45) Date of Patent: Nov. 16, 2004

(54) OPTICAL CORRELATOR USING SPATIAL LIGHT MODULATOR ILLUMINATION

(75) Inventors: Harold R. Garner, Flower Mound, TX (US); Richard O. Gale, Allen, TX (US)

(73) Assignees: Board of Regents, The University of Texas System, Austin, TX (US); Texas Instruments Incorporated, Dallas, TX (US)

( * ) Notice: Subject to any disclaimer, the term of this patent is extended or adjusted under 35 U.S.C. 154(b) by 6 days.

(21) Appl. No.: 09/933,778

(22) Filed: Aug. 20, 2001

(65) Prior Publication Data

US 2002/0024715 A1 Feb. 28, 2002

Related U.S. Application Data

(60) Provisional application No. 60/227,397, filed on Aug. 23, 2000.

(51) Int. Cl.[7] ................................................. G02F 1/01
(52) U.S. Cl. ............................................................ 385/1
(58) Field of Search ........................ 385/1, 2, 3, 5, 385/15, 88, 92, 31; 359/181, 184, 185

(56) References Cited

U.S. PATENT DOCUMENTS 4,695,973 A * 9/1987 Yu ............................. 364/822
5,440,669 A * 8/1995 Rakuljic et al. ................ 359/7
5,671,090 A * 9/1997 Pernick et al. ............... 359/561

OTHER PUBLICATIONS

Optical Correlator, What Can an Optical Correlator Do?; http://www.opticalcorrelator.com/optical%20correlator/optical_correlator.htm, Jul. 24, 2000.

Goldstein, Dr. Dennis; AFRL/MNGI Optical Correlator Technology, "Optical Correlator Technology"; http//www.mn.afrl.af.mil/public/mngi/optcorr.html, Jul. 24, 2000.

"5. Optical Correlator Using a Liquid Crystal Spatial Light Modulator"; http//www.aist.go.jp/MEL/result/result–e5.htm, Jul. 24, 2000.

* cited by examiner

Primary Examiner—Javaid H. Nasri
(74) Attorney, Agent, or Firm—Charles A. Brill; Wade James Brady, III; Frederick J. Telecky, Jr.

(57) ABSTRACT

An optical correlator (10) that uses a spatial light modulator (11) to illuminate a pattern of on and off pixels into a length of an optical fiber (12). The spatial light modulator (11) is optically coupled to the length of fiber (12) so that the illumination enters the fiber along that length. The optical fiber (12) also carries light representing a bitstream of data. At the optical fiber, the illumination from the spatial light modulator interacts with the illumination of the optical bitstream. A detector (14) is optically coupled to the same length of fiber (12) and detects the resulting optical response to determine if a correlation exists.

25 Claims, 1 Drawing Sheet

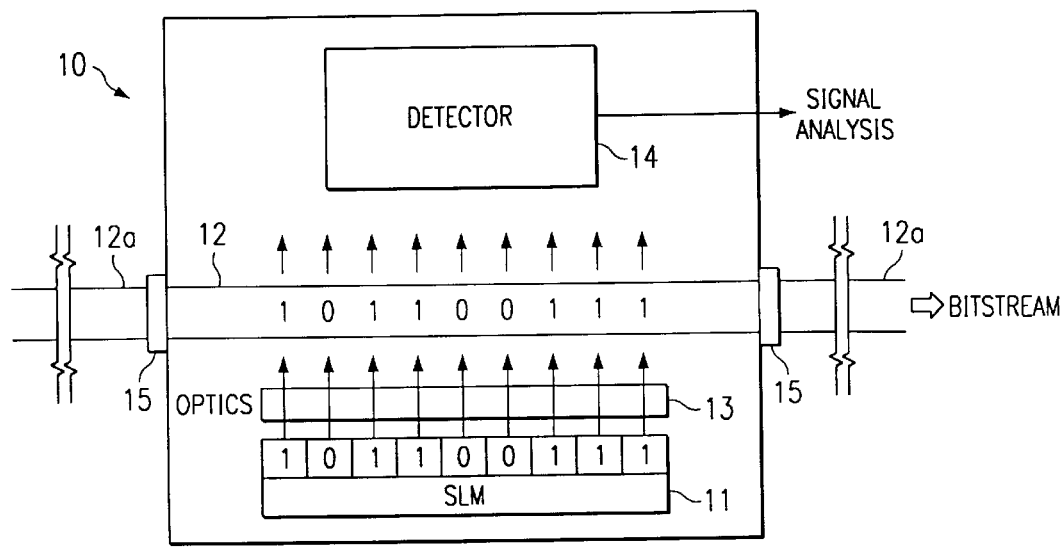
FIG. 1
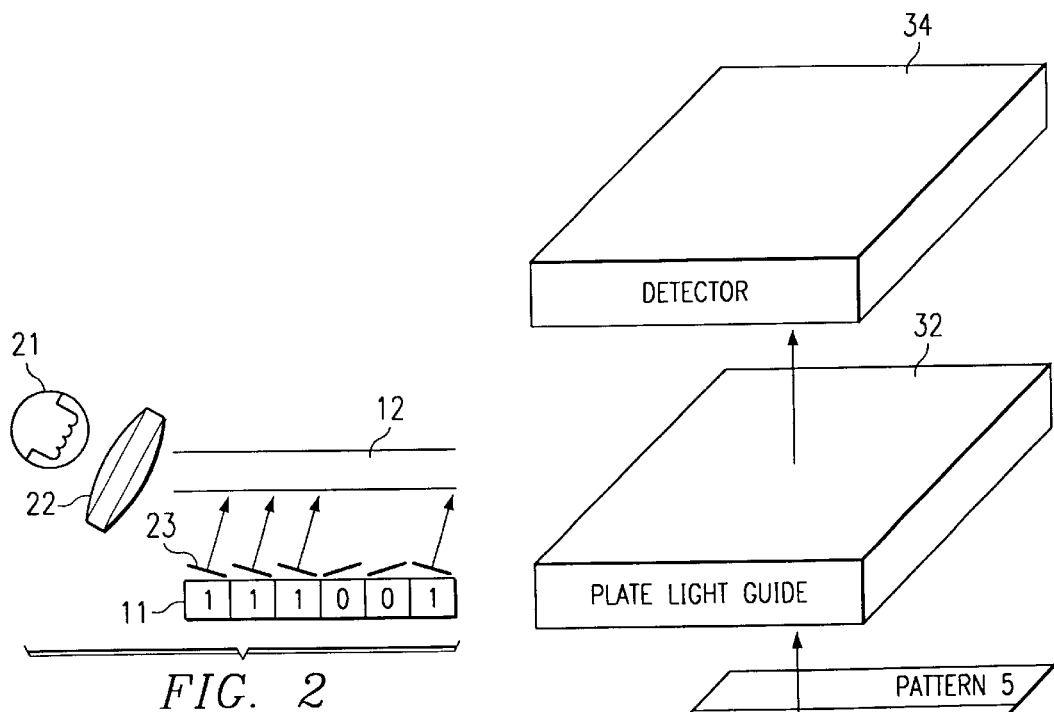
FIG. 2
FIG. 3

OPTICAL CORRELATOR USING SPATIAL LIGHT MODULATOR ILLUMINATION

This application claims priority under 35 USC §119(e)(1) of provisional application No. 60/227,397 filed Aug. 23, 2000.

TECHNICAL FIELD OF THE INVENTION

This invention relates to optical processing, and more particularly to an optical correlator comprising a spatial light modulator optically coupled to a length of an optical guide.

BACKGROUND OF THE INVENTION

Spatial light modulators (SLMs) have a diversity of applications in addition to their more commonly known application for display systems. One application is in optical correlation systems, which are processing systems designed to perform computationally intensive image correlation.

Conventionally, for optical correlator applications, the SLM is used to generate a reference image. A second image is captured from some sort of sensor input. The two images are then compared to determine the degree of correlation. The two dimensional imaging capabilities of the SLM make them especially useful for pattern recognition.

The determination of whether two images correlate can be made by means of either optical processing or with digital computer "number crunching". Many optical correlation systems are hybrid systems that use both optical and electrical components.

SUMMARY OF THE INVENTION

One aspect of the invention is an optical correlator that detects whether a given pattern of on and off illumination matches a portion of an optical bitstream. A spatial light modulator has at least one row of pixel generating elements. Each row generates a one-dimensional pattern of on or off illumination. An optical guide, such as an optical fiber, is optically linked to each row, such that a length of the optical guide receives the illumination from that row. The optical guide is further operable to transmit a bitstream of optical information. A detector is optically linked along the same length of the optical guide, such that the detector is operable to receive illumination representing the interaction of the bitstream and the illumination from the spatial light modulator.

An advantage of the invention is that the correlator may be used to continuously monitor for a particular bit pattern being transmitted down an optical guide, such as optical fiber used for telecommunications. The target pattern on the spatial light modulator may be easily and quickly changed. The interrogation of the bitstream occurs rapidly.

The analysis of the combined illumination in the light guide can range from simple optical processing to sophisticated digital algorithms. Fourier analysis of sum and difference, match and search, and filter and mix algorithms can be applied.

BRIEF DESCRIPTION OF THE DRAWINGS

FIG. 1 illustrates an optical correlator in accordance with the invention.

FIG. 2 illustrates the operation of the spatial light modulator of FIG. 1 when it is a DMD™ type spatial light modulator.

FIG. 3 illustrates the optical correlator with a spatial light modulator having multiple rows for detecting patterns in multiple bitstreams.

DETAILED DESCRIPTION

FIG. 1 illustrates an optical correlator 10 in accordance with the invention. A spatial light modulator (SLM) 11 is optically coupled to a length of an optical guide, here an optical fiber 12. As explained below, this optical coupling may be achieved by any means that permits light from the SLM 11 to enter, or to interact with the surface of, optic fiber 12. A second optical coupling permits the interaction of light within fiber 12 to exit fiber 12 toward detector 14.

Correlator 10 may be easily contained in a small compact housing. In the example of FIG. 1, simple connectors 15 could be used to connect two ends of an optical fiber 12a.

The optical fiber 12a into and out of correlator 10 may be a conventional optical fiber of the type designed to transmit optical communications. Thus, it carries a bitstream of information in the form of light as a signal carrier. As explained in connection with FIG. 3, the embodiment of FIG. 1 having a single-fiber and a single row of the SLM is a simple version of the invention; other embodiments use a two dimensional SLM, with an optical guide associated with each row.

The length of optical fiber 12 within correlator 10 is modified to provide the optical coupling for light to from SLM 11 to interact with the light being carried by fiber 12, and to provide a response to detector 14. In one embodiment, fiber 12a may be replaced within correlator 10 by a special fiber that provides the optical coupling. In other embodiments, fiber 12a may run continuously through correlator 10, but be coated or otherwise surrounded by an appropriate optical coupling material.

Although both the optical fiber 12 within correlator 10 and the optical fiber 12a into and out of correlator 10 are described as "fibers" the invention is not limited to optical fiber light guides. For purposes of this description, various other types of data-carrying light guides are considered equivalent to an optical fiber. These include plate and planar guides, especially in the case of the multiple-row embodiments described below in connection with FIG. 3.

SLM 11 may be any type of spatial light modulator. These devices are characterized by having a one or two dimensional array of individually addressable "pixel generating elements". These elements are coded with image data to display a pattern of on or off points of light. SLMs may be reflective as in the example of this description, or transmissive.

In the example of this description, SLM 11 is a digital micromirror device (DMD), of the type manufactured by Texas Instruments Incorporated. A DMD has an array of tiny mirrors as its pixel generating elements. Each mirror can be tilted to an on position or an off position. A pattern of on (bright) or off (dark) bits can be generated by switching the appropriate mirrors on or off. For purposes of this invention, the on mirrors would be focused such that the light they reflect would be directed along a length of fiber 12.

Optics 13 may be used to focus the illumination generated by SLM 11 to the fiber 12. An example of suitable optics 13 is a cylindrical lens between and parallel to SLM 11 and fiber 12. Optics 13 could be used to expand or contract the illumination from SLM 11 so as to "fit" the bitstream carried by fiber 12.

As stated above, detector 14 detects the light (bitstream) being carried by the fiber 12 within that length at a given moment of time, plus the illumination received into the fiber from SLM 11. An example of a suitable detector 14 is a CCD type detector that acquires a value for a number of bit positions along the length of fiber 12, that is, it reports each spatial position. Or, the CCD might be a summing detector that measures total response. Another example is a detector that optically combines the light from the length fiber 12 and detects the combined intensity. Detector 14 could be a filtered detector that measures light emitted from the fiber 12 at one wavelength in response to illumination from the SLM 11 at a different wavelength. A coherent light source at a known wavelength could be used to illuminate SLM 11 and fiber 12 used to carry light at a known wavelength, and detector 14 used to for phase or beat measurements.

FIG. 2 is a simplified illustration of the operation of a DMD type SLM 11 and the additional optical components of correlator 10 when SLM 11 is a DMD. One row of SLM 11 is aligned parallel to the length, L, of fiber 12. A light source 21 and optics 22 are used to illuminate the surface of the mirrors 23. The on mirrors are coded with high bits and the light from those mirrors enters or impinges on fiber 12 along length, L. The off mirrors are coded with low bits and the light from those mirrors is directed elsewhere. The tilt angle of the mirrors could be adjusted to optimize illumination to fiber 12 or to optimized a desired response at fiber 12, such as by providing illumination at a Bragg angle.

Light source 21 could be a white light source. Alternatively, a coherent source such as a laser could be used, or source 21 could be filtered to obtain a desired wavelength. As explained below, one approach to providing the optical coupling makes use of illumination from SLM 11 at a single wavelength.

The optical coupling of SLM 11 and detector 14 to fiber 12 could be achieved by various means. These include various coatings, as well as materials into which fiber 12 could be immersed. Various materials exist that permit light to enter or exit the side of an optical fiber, with minimal loss to data being transmitted. The same principles as used to cause light to enter fiber 12 from SLM 11 may be applied to cause light to exit fiber 12 to detector 14. However, the optical couplings for SLM 11 and detector 14 need not be the same.

As explained below, the optical coupling may cause light from SLM 11 to enter fiber 12 and to interact within fiber 12 with light carried by fiber 12. Or the optical coupling may cause an interaction at a surface of fiber 12 rather than inside fiber 12. This surface may be that of the data-carrying layer of fiber 12 or at the surface of another layer. For purposes of this description, these various types of interactions are generally referred to as being "at" fiber 12. Different approaches to achieving the optical coupling include coating or immersing the fiber, using various oils, materials that shift the index of refraction, materials that cause a fluorescent interaction, materials that cause an energy transfer, or materials that respond to photon pumping.

Mores specifically, coatings exist that could be applied to fiber 12 so as to permit it to receive and transmit light from its sides. Some coatings operate so as to modify the index of refraction from that of a typical fiber cladding that is designed to prevent light from escaping. Or, fiber 12 could be immersed in a liquid having a similar effect on the index of refraction.

Other types of materials might cause a desired interaction between the illumination from SLM 11 and the bitstream within fiber 12. An example of a fiber coating that would achieve the desired coupling is a material that fluoresces when illuminated with light from SLM 11. Such a coating could cause the fluorescent response to enter fiber 12. Or, an interaction within fiber 12 might cause light to radiate from fiber 12 to detector 14.

Optical coupling environments (coatings and liquids) have been used in the field of fiber optic sensors, such as biosensors. For example, coatings on fibers have been used to detect glucose within the human body. The fiber is inserted into the body. In the presence of glucose, a coating on the fiber modifies the properties of the circumference of the fiber to permit light to enter or exit the sides of the fiber.

The optical coupling could also be achieved by using a material on fiber 12 that responds to photon pumping. The material could be pumped to some intermediate state having a relatively long excited state. A correlation might then cause a response, such as when a correlation causes light to leak out to the photon-responsive surface.

In operation, SLM 11 is coded to display a "target" pattern. In other words, the SLM 11 is coded to display a pattern of bits that is being looked for in the bitstream carried by fiber 12. For example, SLM 11 might be coded to generate a pattern of bits that represent the words "bomb". Each pixel generating element would represent a 1 or 0 bit, depending on whether it is on or an off.

The output of the SLM is "static" in the sense that it is displayed for a desired interrogation period. During this period, the SLM output illumination continuously enters the fiber 12 along its length. Meanwhile, a bitstream of data, such as that representing a telephone conversion, is being transmitted along fiber 12.

Because of the optical coupling of SLM 11 to fiber 12, the output of the SLM interacts with the optical bitstream being carried by the fiber 12. The task of correlator 10 is to determine whether optical fiber 12 transmits the target pattern during a given duration of time.

In the example of FIG. 1, the target pattern is the series of the following nine bits: "101100111". This represents the output of the row of the SLM 11. The number of bits may be quite large. For example, today's DMDs are manufactured with up to 1280 bits per row, and multiple DMDs could be chained. In the example of FIG. 1, detector 14 detects each bit's interaction with the optical bitstream being carried by fiber 12. In other embodiments, the bits from fiber 12 could be integrated.

Detector 14 detects the interaction of the bitstream carried by fiber 12 plus the light from the SLM 11 that has entered the fiber. If the SLM output were to match that of the bitstream, at some instant, the transmitted bits within the length of fiber would align with the bits represented by the SLM output.

In one embodiment, detector 14 would in effect, detect the superposition of the SLM illumination and the bitstream. The detected intensities would be different (brighter or dimmer) when there is a correlation. In other embodiments, the interaction of the SLM illumination and the bitstream could cause a response in the coupling material that would then provide a detectable change in illumination.

The coupling between fiber 12 and SLM 11 between fiber 12 and detector 14 could provide either a linear or nonlinear response. It may be desirable to have a nonlinear coupling in order to enhance the ability to couple light in or out of fiber 12. In the case of a nonlinear coupling, in the absence of correlation, the light within fiber 12 could be insufficiently intense to provoke a response by the coupling material. However, if a correlation exists, the intensity would be sufficient to provoke a response detectable by detector 14. In other words, the coupling would elicit a detectable response above a certain threshold.

The output of detector 14 can be processed using a wide variety of known correlation techniques. For example, a bit-by-bit pattern from detector 14 could be the output of interest. Alternatively, the detector output could be integrated, digitally or optically. More sophisticated analysis could be performed for such tasks as determining whether some portion of the bits match.

In this manner, correlator 10 can be used to detect whether a given pattern of bits is being transmitted. The target pattern displayed by SLM 11 can be changed quickly at any desired frequency. Or, the same target pattern could remain continuously displayed.

In other embodiments, SLM 11 could be a two-dimensional array. A fiber 12 would be coupled to each row of pixel generating elements. If desired, a different target pattern could be generated for each row. For example, SLM 11 could be have 600 rows with 800 pixel-generating elements per row. Correlator 10 would then have 600 fibers 12, one fiber coupled to each row. Correlator 10 could then be used to interrogate as many as 600 fibers, looking for as many as patterns, each pattern having up to 800 bits.

FIG. 3 illustrates a two dimensional correlator 30. A two dimensional SLM 31 displays a pattern on each row. These may be the same pattern or may be different for each row. In one embodiment, each row of SLM 31 is associated with a fiber of a fiber bundle. As an alternative to a fiber for each row, a plate light guide 32 is optically coupled to both SLM 11 and detector 34, so that light may enter into and exit from the surface area indicated by the arrows. Plate light guide 32 carries as many channels of data as there are rows of SLM 31. As described above, the light exiting light guide 32 and detected by detector 34 represents an interaction within light guide 32 between the SLM output and the transmitted data.

Other Embodiments

Although the present invention has been described in detail, it should be understood that various changes, substitutions, and alterations can be made hereto without departing from the spirit and scope of the invention as defined by the appended claims.

What is claimed is:

1. An optical correlator, comprising:
a spatial light modulator having at least one row of pixel generating elements, said at least one row operable to generate a one-dimensional pattern of on or off illumination;
an optical guide optically coupled to said at least one row such that a length of the optical guide may receive the illumination from that row, the optical guide operable to transmit a bitstream of optical information; and
a detector placed along the same length of the optical guide, optically linked to the optical guide such that the detector is operable to receive illumination from the length of optical guide representing the interaction at the guide between the bitstream and the illumination from the spatial light modulator.

2. The correlator of claim 1, wherein the optical coupling is between the guide and the detector is linear such that the interaction provides illumination proportional to the combined intensities of the bitstream and the illumination from the spatial light modulator.

3. The correlator of claim 1, wherein the optical coupling between the guide and the detector is nonlinear such that the interaction provides significant output illumination only above a threshold illumination.

4. The correlator of claim 1, wherein the optical coupling between the spatial light modulator and the guide is achieved by coating the guide.

5. The correlator of claim 1, wherein the optical coupling between the spatial light modulator and the guide is achieved by immersing the guide in a fluid.

6. The correlator of claim 1, wherein the optical coupling between the spatial modulator and the guide modifies the index of refraction of the guide.

7. The correlator of claim 1, wherein the optical coupling between the spatial light modulator and the guide causes an interaction of light within the guide.

8. The correlator of claim 1, wherein the optical coupling between the spatial light modulator and the guide causes an interaction of light at the surface of the guide.

9. The correlator of claim 1, wherein the optical coupling between the detector and the guide is achieved by coating the guide.

10. The correlator of claim 1, wherein the optical coupling between the detector and the guide is achieved by immersing the guide in a fluid.

11. The correlator of claim 1, wherein the optical coupling between the detector and the guide modifies the index of refraction of the guide.

12. The correlator of claim 1, wherein the optical coupling between the detector and the guide causes an interaction of light within the guide.

13. The correlator of claim 1, wherein the optical coupling between the detector and the guide causes an interaction of light at the surface of the guide.

14. The correlator of claim 1, wherein a single optical coupling couples the spatial light modulator and the guide and the detector and the guide.

15. The correlator of claim 1, wherein the optical guide is an optical fiber.

16. The correlator of claim 1, wherein the spatial light modulator is a digital micro mirror device.

17. The correlator of claim 1, wherein the spatial light modulator is a liquid crystal device.

18. The correlator of claim 1, wherein the spatial light modulator has multiple rows.

19. The correlator of claim 18, wherein the light guide is a plate light guide.

20. A method of correlating a bitstream carried by an optical guide with a target pattern, comprising the steps of:
illuminating the optical guide with a pattern of on and off illumination generated by a spatial light modulator;
receiving the illumination from the spatial light modulator into a length of the optical guide; and
detecting the interaction, at the optical guide, of the illumination from the spatial light modulator and the bitstream.

21. The method of claim 20, wherein the receiving step is performed by using a coating that optically couples the optical guide to the spatial light modulator.

22. The method of claim 20, wherein the detecting step is performed by using a coating that optically couples a detector to the optical guide.

23. The method of claim 20, wherein the detecting step is performed by detecting a nonlinear response of an optical coupling of the spatial light modulator to the optical guide.

24. The method of claim 20, wherein the pattern is generated by a single row of the spatial light modulator and the guide carries a single bitstream.

25. The method of claim 20, wherein the pattern is a generated by an SLM array and the guide carries multiple bitstreams.

* * * * *